(12) United States Patent
Sugihara et al.

(10) Patent No.: US 9,019,186 B2
(45) Date of Patent: Apr. 28, 2015

(54) LIQUID CRYSTAL DISPLAY DEVICE

(75) Inventors: Toshinori Sugihara, Osaka (JP); Toshihide Tsubata, Osaka (JP); Yuki Yamashita, Osaka (JP); Fumikazu Shimoshikiryoh, Osaka (JP); Mitsuaki Hirata, Osaka (JP); Kenichi Hyohdoh, Osaka (JP); Ikumi Itsumi, Osaka (JP); Akane Sugisaka, Osaka (JP); Masae Kitayama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 113 days.

(21) Appl. No.: 13/575,741

(22) PCT Filed: Jan. 24, 2011

(86) PCT No.: PCT/JP2011/051222
§ 371 (c)(1),
(2), (4) Date: Jul. 27, 2012

(87) PCT Pub. No.: WO2011/093243
PCT Pub. Date: Aug. 4, 2011

(65) Prior Publication Data
US 2012/0306732 A1      Dec. 6, 2012

(30) Foreign Application Priority Data

Jan. 29, 2010   (JP) ................................. 2010-018220

(51) Int. Cl.
*G09G 3/36*    (2006.01)
*G02F 1/1343*  (2006.01)
(Continued)

(52) U.S. Cl.
CPC .... *G02F 1/134336* (2013.01); *G02F 1/136286* (2013.01); *G02B 5/201* (2013.01);
(Continued)

(58) Field of Classification Search
USPC ......................... 345/88, 92, 87; 349/106, 107
See application file for complete search history.

(56) References Cited

U.S. PATENT DOCUMENTS

| 4,800,375 | A  | 1/1989  | Silverstein et al. |
| 6,952,252 | B2 | 10/2005 | Nakanishi |

(Continued)

FOREIGN PATENT DOCUMENTS

| JP | 09-16132  | A | 1/1997 |
| JP | 09-251160 | A | 9/1997 |

(Continued)

OTHER PUBLICATIONS

Official Communication issued in International Patent Application No. PCT/JP2011/051222, mailed on Mar. 22, 2011.

(Continued)

*Primary Examiner* — Fred Tzeng
(74) *Attorney, Agent, or Firm* — Keating & Bennett, LLP

(57) ABSTRACT

A liquid crystal display device (100) according to the present invention has a plurality of pixels that are arranged in columns and rows to form a matrix pattern and one color display pixel (P) is comprised of four or any other larger even number of pixels. The liquid crystal display device (100) of the present invention includes a plurality of source bus lines (13) which run in a column direction. The even number of pixels that form one color display pixel (P) include larger pixels with a relatively large area and smaller pixels with a relatively small area. Each set of pixels to be supplied with a signal voltage from an associated one of the plurality of source bus lines (13) has substantially the same total area as any other set of pixels. According to the present invention, in a liquid crystal display device in which a plurality of pixels that forms one color display pixel includes the larger and smaller pixels, generation of display unevenness that runs in the column direction can be minimized.

14 Claims, 12 Drawing Sheets

(51) Int. Cl.
*G02F 1/1362* (2006.01)
*G02B 5/20* (2006.01)
*G02F 1/1335* (2006.01)

(52) U.S. Cl.
CPC ........... *G09G 3/3607* (2013.01); *G09G 3/3614* (2013.01); *G02F 2001/134345* (2013.01); *G02F 2201/52* (2013.01); *G02F 2203/30* (2013.01); *G09G 2300/0426* (2013.01); *G09G 2300/0452* (2013.01); *G02F 1/133514* (2013.01); *G09G 2320/0233* (2013.01); *G09G 2300/0413* (2013.01); *G09G 2300/0447* (2013.01)

(56) References Cited

U.S. PATENT DOCUMENTS

| | | | |
|---|---|---|---|
| 6,958,791 | B2 | 10/2005 | Shimoshikiryo |
| 6,977,704 | B2 | 12/2005 | Kataoka |
| 7,084,848 | B2 * | 8/2006 | Senda et al. ............... 345/92 |
| 7,268,757 | B2 | 9/2007 | Ben-David et al. |
| 7,843,531 | B2 | 11/2010 | Nakanishi et al. |
| 8,384,856 | B2 * | 2/2013 | Itou et al. .................. 349/106 |
| 2003/0090581 | A1 | 5/2003 | Credelle et al. |
| 2004/0174389 | A1 | 9/2004 | Ben-David et al. |
| 2004/0246404 | A1 | 12/2004 | Elliott et al. |
| 2005/0068281 | A1 | 3/2005 | Shin et al. |
| 2005/0122294 | A1 | 6/2005 | Ben-David et al. |
| 2006/0072058 | A1 | 4/2006 | Rho |
| 2006/0215066 | A1 | 9/2006 | Ueda et al. |
| 2007/0008463 | A1 * | 1/2007 | Tanaka et al. ............. 349/107 |
| 2007/0063946 | A1 | 3/2007 | Nakamura et al. |
| 2007/0229748 | A1 | 10/2007 | Fujita |
| 2008/0084376 | A1 * | 4/2008 | Hirota et al. ............... 345/88 |
| 2008/0272997 | A1 | 11/2008 | Shin et al. |
| 2009/0115952 | A1 | 5/2009 | Nakamura et al. |
| 2009/0128752 | A1 | 5/2009 | Itou et al. |
| 2009/0141381 | A1 | 6/2009 | Itou et al. |
| 2010/0039698 | A1 * | 2/2010 | Robinson et al. ........... 359/316 |

FOREIGN PATENT DOCUMENTS

| | | | |
|---|---|---|---|
| JP | 11-102174 | A | 4/1999 |
| JP | 11-295717 | A | 10/1999 |
| JP | 2001-42287 | A | 2/2001 |
| JP | 2001-209047 | A | 8/2001 |
| JP | 2001-306023 | A | 11/2001 |
| JP | 2002-6303 | A | 1/2002 |
| JP | 2002-357830 | A | 12/2002 |
| JP | 2003-177418 | A | 6/2003 |
| JP | 2004-62146 | A | 2/2004 |
| JP | 2004-529396 | A | 9/2004 |
| JP | 2005-62869 | A | 3/2005 |
| JP | 2006-78968 | A | 3/2006 |
| JP | 2006-133577 | A | 5/2006 |
| WO | 2006/109577 | A1 | 10/2006 |
| WO | 2007/034770 | A1 | 3/2007 |
| WO | 2007/148519 | A1 | 12/2007 |

OTHER PUBLICATIONS

Yang et al.; "31.1: Development of Six Primary-Color LCD"; Society for Information Display, 2005 International Symposium Digest of Technical Papers; vol. XXXVI, Book II; May 25-27, 2005; pp. 1210-1213.

Chino et al.; "25.1: Invited Paper: Development of Wide-Color-Gamut Mobile Displays With Four-Primary-Color LCDS"; Society for Information Display, 2006 International Symposium Digest of Technical Papers; vol. XXXVII, Book II; Jun. 7-9, 2006; pp. 1221-1224.

Ben-Chorin; "Improving LCD TV Color Using Multi-Primary Technology"; FPD International 2005 Forum; Oct. 19, 2005; Total of 66 pages.

M.R. Pointer; "The Gamut of Real Surface Colors"; Color Research and Application, vol. 5, No. 3; 1980; pp. 145-155.

Hanaoka et al.; "40.1: A New MVA-LCD by Polymer Sustained Alignment Technology"; SID 04 Digest; 2004; pp. 1200-1203.

English translation of Official Communication issued in corresponding International Application PCT/JP2011/051222, mailed on Sep. 27, 2012.

* cited by examiner

LIQUID CRYSTAL DISPLAY DEVICE

TECHNICAL FIELD

The present invention relates to a liquid crystal display device and more particularly relates to a liquid crystal display device, each color display pixel of which is comprised of four or any other larger even number of pixels.

BACKGROUND ART

Liquid crystal display devices are currently used in a variety of applications. In a general liquid crystal display device, one color display pixel is comprised of three pixels respectively representing red, green and blue, which are the three primary colors of light, thereby conducting a display operation in colors.

A known liquid crystal display device, however, can reproduce colors that fall within only a narrow range (which is usually called a "color reproduction range"), which is a problem. If the color reproduction range is narrow, then some of the object colors (i.e., the colors of various objects existing in Nature, see Non-Patent Document No. 1) cannot be represented. Thus, to broaden the color reproduction range of liquid crystal display devices, a technique for increasing the number of primary colors for use to perform a display operation has recently been proposed.

For example, Patent Document No. 1 discloses a liquid crystal display device 800 in which one color display pixel P is made up of four pixels that include not only red, green and blue pixels R, G and B representing the colors red, green and blue, respectively, but also a yellow pixel Y representing the color yellow as shown in FIG. 12. That liquid crystal display device 800 performs a display operation in colors by mixing together the four primary colors red, green, blue and yellow that are represented by those four pixels.

By increasing the number of primary colors for use to conduct a display operation (i.e., by performing a display operation using four or more primary colors), the color reproduction range can be broadened compared to a known liquid crystal display device that uses only the three primary colors for display purposes. Such a liquid crystal display device that conducts a display operation using four or more primary colors will be referred to herein as a "multi-primary-color liquid crystal display device".

However, if the number of primary colors for use to conduct a display operation is increased, then the number of pixels per color display pixel increases, and therefore, the area given to each of those pixels should decrease if the area of one color display pixel remained the same. Consequently, the lightness of the color represented by each pixel should decrease. For example, if the number of primary colors for use to conduct a display operation is increased from three to four, the area given to each pixel decreases to three-quarters, and the lightness of each pixel drops to three-quarters, too. Also, if the number of primary colors for use to conduct a display operation is increased from three to six, the area given to each pixel decreases to one half, and the lightness of each pixel drops to one half, too.

As for a pixel representing the color green or yellow, even if its lightness decreases to a certain degree, the pixel can still represent various object colors well enough. As for a pixel representing the color red, however, if its lightness decreases, the display quality of some of those object colors declines. In this manner, if the lightness decreases due to an increase in the number of primary colors to use, the display quality of the color red will be debased and the color red will turn into a blackish red (i.e., a dark red).

A technique for overcoming such a problem is proposed in Patent Document No. 2. FIG. 13 illustrates a liquid crystal display device 900 as disclosed in Patent Document No. 2. Each color display pixel P of the liquid crystal display device 900 is made up of red, green, blue, and yellow pixels R, G, B and Y. In the liquid crystal display device 900, however, the red and blue pixels R and B have the larger area and the green and yellow pixels G and Y have the smaller area. By setting the area of the red pixel R to be larger than in a situation where a single color display pixel P is simply equally divided into four, the lightness of the color red increases, and therefore, a bright red can be represented.

CITATION LIST

Patent Literature

Patent Document No. 1: PCT International Application Japanese National-Phase Patent Publication No. 2004-529396

Patent Document No. 2: PCT International Application Publication No. 2007/148519

Non-Patent Literature

Non-Patent Document No. 1: M. R. Pointer, "The Gamut of Real Surface Colors", Color Research and Application, Vol. 5, No. 3, pp. 145-155 (1980)

SUMMARY OF INVENTION

Technical Problem

If the pixel arrangement disclosed in Patent Document No. 2 is adopted, however, columns of pixels comprised of red and blue pixels R and B with the larger area alternate with columns of pixels comprised of green and yellow pixels G and Y with the smaller area as shown in FIG. 13. That is why the total area of pixels that are connected to a source bus line associated with any of the former columns of pixels becomes different from that of pixels that are connected to a source bus line associated with any of the latter columns of pixels. That is to say, the capacitive loads on those two source bus lines will be different from each other. Consequently, display unevenness that runs in the column direction (which will be referred to herein as "vertical fringes") could be seen on the screen.

It should be noted that such display unevenness is observed in not only such an arrangement in which the red and blue pixels R and B have the larger area and the green and yellow pixels G and Y have the smaller area as shown in FIG. 13. Rather such display unevenness could be observed in any other arrangement in which a plurality of pixels that forms one color display pixel includes larger pixels with a relatively large area and smaller pixels with a relatively small area.

In order to overcome such problems, the present invention has been made to avoiding causing such display unevenness that runs in the column direction in a liquid crystal display device, of which one color display pixel is comprised of larger and smaller pixels.

Solution to Problem

A liquid crystal display device according to the present invention has a plurality of pixels that are arranged in columns and rows to form a matrix pattern and one color display pixel is comprised of four or any other larger even number of pixels. The device includes a plurality of source bus lines which run in a column direction. The even number of pixels include larger pixels with a relatively large area and smaller pixels with a relatively small area. Each set of pixels to be supplied with a signal voltage from an associated one of the plurality of source bus lines has substantially the same total area as any other set of pixels.

In one preferred embodiment, one half of the even number of pixels are the larger pixels and the other half are the smaller pixels.

In one preferred embodiment, each said set of pixels includes the same number of the larger pixels as the smaller pixels.

In one preferred embodiment, the plurality of pixels are arranged so that a column of pixels comprised of the larger pixels alternates with a column of pixels comprised of the smaller pixels in a display area.

In one preferred embodiment, each of the plurality of pixels includes a switching element that is connected to an associated one of the plurality of source bus lines. The switching elements that are connected to an arbitrary one of the source bus lines include one group of switching elements of the pixels belonging to one of two columns of pixels that are adjacent to the arbitrary source bus line and the other group of switching elements of the pixels belonging to the other column of pixels. And the one and the other groups each include the same number of switching elements.

In one preferred embodiment, the plurality of pixels include dummy pixels that do not contribute to a display operation. The plurality of pixels are arranged so that a column of pixels comprised of the dummy pixels is located outside of a display area. Switching elements that are connected to two of the plurality of source bus lines that are located at both ends in a row direction include one number of switching elements of pixels belong to a column of pixels inside of the display area and the same number of switching elements of pixels belonging to another column of pixels outside of the display area.

In one preferred embodiment, the even number of pixels are arranged in p rows and q columns (where p and q are integers that are equal to or greater than two).

In one preferred embodiment, the even number of pixels are arranged in one row and r columns (where r is an even number that is equal to or greater than four).

In one preferred embodiment, the even number of pixels are arranged in p rows and q columns (where p and q are integers that are equal to or greater than two), and the even number of pixels are also arranged so as to prevent an arbitrary one of the p rows from having pixels with different areas in the same mix.

In one preferred embodiment, a half of the even number of pixels are the larger pixels and the other half are the smaller pixels.

In one preferred embodiment, each said set of pixels includes the same number of the larger pixels as the smaller pixels.

In one preferred embodiment, the plurality of pixels are arranged so that a row of pixels comprised of the larger pixels alternates with a row of pixels comprised of the smaller pixels.

In one preferred embodiment, the liquid crystal display device of the present invention further includes a plurality of gate bus lines that run in a row direction, and each set of pixels to be supplied with a scan voltage from an associated one of the plurality of gate bus lines has substantially the same total area as any other set of pixels.

In one preferred embodiment, each said set of pixels to be supplied with the scan voltage from an associated one of the plurality of gate bus lines includes the same number of the larger pixels as the smaller pixels.

In one preferred embodiment, the liquid crystal display device of the present invention further includes a plurality of gate bus lines that run in a row direction. Each of the plurality of pixels includes a switching element that is connected to an associated one of the plurality of gate bus lines. The switching elements that are connected to an arbitrary one of the gate bus lines include one group of switching elements of the pixels belonging to one of two rows of pixels that are adjacent to the arbitrary gate bus line and the other group of switching elements of the pixels belonging to the other row of pixels. And the one and other groups each include the same number of switching elements.

In one preferred embodiment, the plurality of pixels include dummy pixels that do not contribute to a display operation. The plurality of pixels are arranged so that a row of pixels comprised of the dummy pixels is located outside of a display area. And switching elements that are connected to two source bus lines of the plurality of gate bus lines that are located at both ends in a column direction include one number of switching elements of pixels belonging to a row of pixels inside of the display area and the same number of switching elements of pixels belonging to another row of pixels outside of the display area.

In one preferred embodiment, the even number of pixels include at least red, green and blue pixels.

In one preferred embodiment, the even number of pixels further include a yellow pixel.

In one preferred embodiment, the red and blue pixels are the larger pixels, and the green and yellow pixels are the smaller pixels.

In one preferred embodiment, the even number of pixels are four pixels.

In one preferred embodiment, the even number of pixels are six pixels.

Advantageous Effects of Invention

According to the present invention, it is possible to avoid causing display unevenness that runs in the column direction in a liquid crystal display device, of which one color display pixel is comprised of larger and smaller pixels.

DESCRIPTION OF EMBODIMENTS

A liquid crystal display device according to the present invention has a plurality of pixels that are arranged in columns and rows to form a matrix pattern and a plurality of source bus lines which run in a column direction. In the liquid crystal display device of the present invention, one color display pixel is comprised of four or any other larger even number of pixels. The even number of pixels include pixels with a relatively large area (which will be referred to herein as "larger pixels") and pixels with a relatively small area (which will be referred to herein as "smaller pixels").

In this manner, in the liquid crystal display device of the present invention, one color display pixel includes the larger and smaller pixels in the same mix. However, as multiple sets of pixels that are connected to each of the plurality of source bus lines (i.e., that are supplied with a signal voltage from that source bus line) have substantially the same total area, the display unevenness that runs in the column direction can be minimized.

Hereinafter, embodiments of the present invention will be described with reference to the accompanying drawings. It should be noted, however, that the present invention is in no way limited to the specific embodiments to be described below.

(Embodiment 1)

Figure 1:
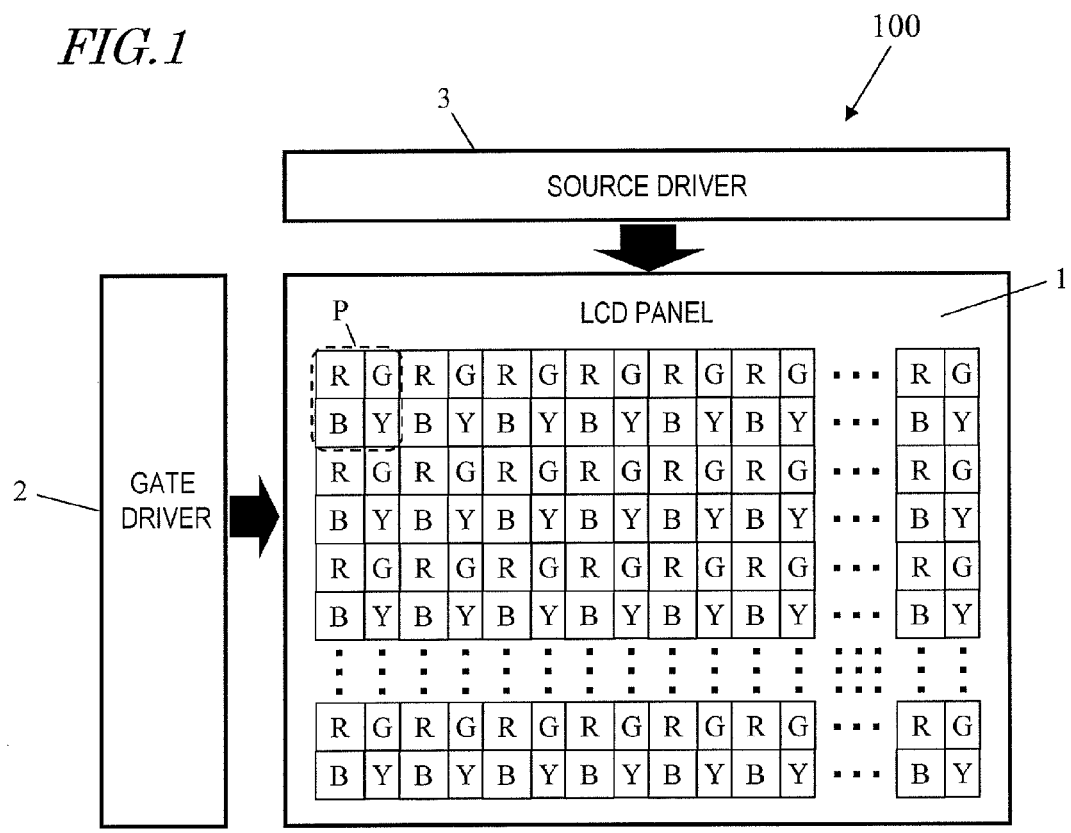
[FIG. 1] A plan view schematically illustrating a liquid crystal display device 100 as a preferred embodiment of the present invention.

FIG. 1 illustrates a liquid crystal display device 100 as a first embodiment of the present invention. As shown in FIG. 1, the liquid crystal display device 100 includes an LCD panel 1, and a gate driver (scan line driver) 2 and a source driver (signal line driver) 3 that supply drive signals to the LCD panel 1.

The LCD panel 1 includes a plurality of pixels that are arranged in columns and rows to form a matrix pattern. One color display pixel P is comprised of four pixels that are arranged in two columns and two columns.

Specifically, the four pixels that form one color display pixel P are red, green, blue, and yellow pixels R, G, B and Y representing the colors red, green, blue, and yellow, respectively. That is to say, one color display pixel P is made up of four different kinds of pixels that represent mutually different colors.

In this embodiment, the red and blue pixels R and B have a relatively large area and the green and yellow pixels G and Y have a relatively small area. That is to say, the red and blue pixels R and B are the larger pixels and the green and yellow pixels G and Y are the smaller pixels. As can be seen, a half of the four (i.e., an even number of) pixels that form one color display pixel P, i.e., two pixels, are the larger pixels, while the other half (i.e., the other two pixels) are the smaller pixels.

In the example illustrated in FIG. 1, those four pixels are arranged in the order of red, blue, yellow and green pixels R, B, Y and G counterclockwise from the upper left corner within each color display pixel P. Thus, if columns of pixels comprised of a plurality of pixels are sequentially counted "$1^{st}$, $2^{nd}$, $3^{rd}$ ... colums of pixels" from the left to the right, then each odd-numbered column of pixels is comprised of red and blue pixels R and B and each even-numbered column of pixels is comprised of green and yellow pixels G and Y. In other words, the plurality of pixels of this liquid crystal display device 100 are arranged so that columns of pixels comprised of the larger pixels alternate with columns of pixels comprised of the smaller pixels within the display area.

As described above, in the liquid crystal display device 100 of this embodiment, the larger and smaller pixels are included in the same mix within one color display pixel P. Hereinafter, a more specific configuration for this liquid crystal display device 100 will be described with reference to FIG. 2.

Figure 2:
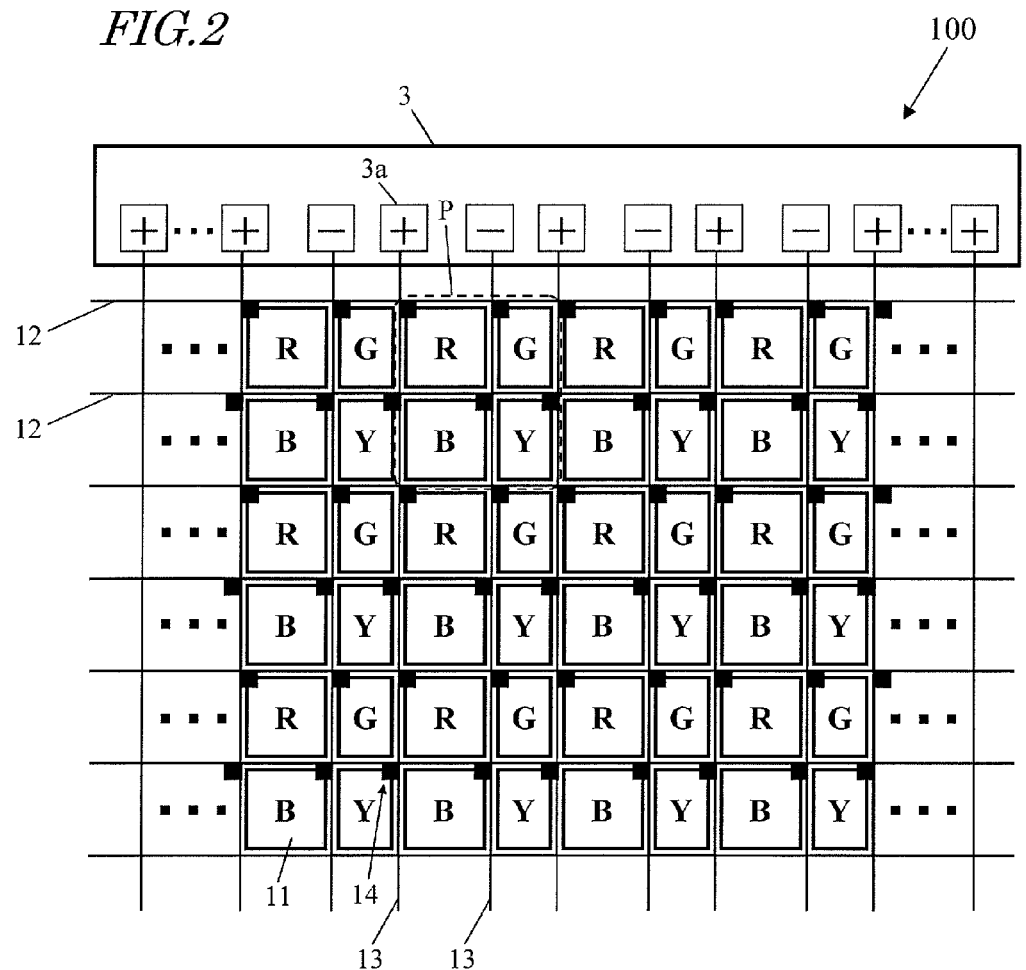
[FIG. 2] A plan view schematically illustrating a part of the liquid crystal display device 100 as the preferred embodiment of the present invention.

As shown in FIG. 2, this liquid crystal display device 100 includes a plurality of gate bus lines (also called "scan lines") 12 that run in the row direction and a plurality of source bus lines (also called "signal lines") 13 that run in the column direction. The gate bus lines 12 are connected to the gate driver 2. On the other hand, the source bus lines 13 are connected to the source driver 3. More specifically, each of the source bus lines 13 is connected one to one to an associated one of the output terminals 3a. A positive or negative grayscale voltage (signal voltage) is output through each of those output terminals 3a.

Also, each of the plurality of pixels of this liquid crystal display device 100 includes a thin-film transistor (TFT) 14 functioning as a switching element and a pixel electrode 11 that is connected to the TFT 14. The TFT 14 is connected to an associated one of the gate bus lines 12 and an associated one of the source bus lines 13.

Although not shown, the LCD panel 1 of this liquid crystal display device 100 includes an active-matrix substrate (TFT substrate), a counter substrate (color filter substrate) that faces the active-matrix substrate, and a liquid crystal layer interposed between them. The gate bus lines 12, source bus lines 13, TFTs 14 and pixel electrodes are all arranged on the active-matrix substrate. The counter substrate is provided with a counter electrode (not shown, either) that faces the pixel electrodes 11. In each pixel, its pixel electrode 11, the counter electrode and the liquid crystal layer interposed between them form a liquid crystal capacitor for that pixel. If the IPS mode or the FFS mode is adopted as a mode of display, the counter electrode is also arranged on the active-matrix substrate.

In the liquid crystal display device 100 of this embodiment, the TFTs 14 are arranged with respect to each source bus line 13 differently from in a general liquid crystal display device. As shown in FIG. 2, the TFTs 14 of pixels belonging to a column of pixels that is located on the right-hand side of each source bus line 13 and the TFTs 14 of pixels belonging to another column of pixels that is located on the left-hand side of that source bus line 13 are alternately connected to that source bus line 13 in the column direction. Specifically, if attention is paid to a source bus line 13 that runs between a column of pixels comprised of green and yellow pixels G and Y on the left and another column of pixels comprised of red and blue pixels R and B on the right, it can be seen that the TFTs 14 of the red pixels R and the TFTs 14 of the yellow pixels Y are alternately connected to the source bus line 13. Meanwhile, if attention is paid to a source bus line 13 that runs between a column of pixels comprised of red and blue pixels R and B on the left and another column of pixels comprised of green and yellow pixels G and Y on the right, it can be seen that the TFTs 14 of the green pixels G and the TFTs 14 of the blue pixels B are alternately connected to that source bus line 13.

In this manner, those TFTs 14 are arranged in a hound's-tooth check pattern with respect to each source bus line 13. That is why the TFTs 14 that are connected to an arbitrary one of the source bus lines 13 include a group of TFTs 14 of pixels belonging to one of the two columns of pixels that are adjacent to that source bus line 13 and another group of TFTs 14 of pixels belonging to the other column of pixels, and these two groups are comprised of the same number of TFTs 14.

That is to say, sets of pixels to be supplied with a signal voltage from its associated source bus line 13 include as many larger pixels as smaller pixels. That is why the total area of those sets of pixels (i.e., sets of pixels that are connected to a single source bus line 13) is substantially the same. Consequently, in the liquid crystal display device 100 of this embodiment, generation of display unevenness that runs in the column direction (i.e., vertical fringes) can be reduced significantly.

It should be noted that the total area of the sets of pixels that are connected to each source bus line 13 does not have to be exactly the same everywhere. However, to reduce the generation of display unevenness more securely, the total areas had better be as close to each other as possible. Specifically, the variation in total area had better be ±15% or less. In this description, if the total area of sets of pixels that are connected to each source bus line 13 is "substantially the same", it means herein that its variation is within ±15%.

Furthermore, the liquid crystal display device 100 of this embodiment has a configuration in which the total area of sets of pixels that are connected to one of two source bus lines 13 that are located at farthest ends (i.e., at the outermost ends) in the row direction is substantially the same as that of sets of pixels that are connected to the other source bus line 13. Hereinafter, such a configuration will be described with reference to FIG. 3, which illustrates the structure in the vicinity of the leftmost source bus line 13L and the rightmost source bus line 13R.

Figure 3:
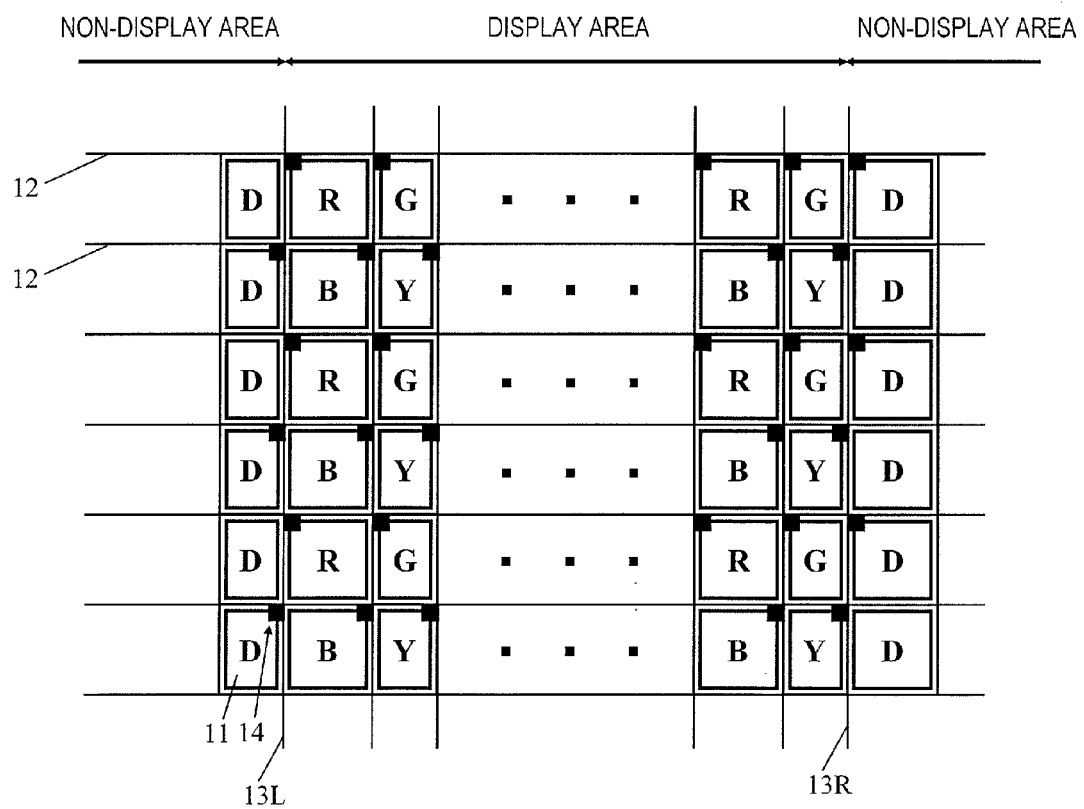
[FIG. 3] A plan view schematically illustrating the structure of the liquid crystal display device 100 in the vicinity of its leftmost and rightmost source bus lines 13L and 13R.

As shown in FIG. 3, the plurality of pixels of this liquid crystal display device 100 includes dummy pixels D that do not contribute to a display operation, and columns of pixels comprised of such dummy pixels D (which will be referred to herein as "columns of dummy pixels") are located outside of the display area (i.e., in a non-display area). The dummy pixels D that are arranged near the leftmost source bus line 13L are smaller pixels that have the same area as green and yellow pixels G and Y. On the other hand, the dummy pixels D that are arranged near the rightmost source bus line 13R are larger pixels that have the same area as red and blue pixels R and B. Each of those dummy pixels D includes a pixel electrode 11 and some of those dummy pixels D have a TFT 14, too.

As shown in FIG. 3, as for each of these source bus lines 13L and 13R at the farthest ends, the TFTs 14 of pixels belonging to a column of pixels that is located on the right-hand side of that source bus line 13L or 13R and the TFTs 14 of pixels belonging to another column of pixels that is located on the left-hand side of that source bus line 13L or 13R are alternately connected to that source bus line 13L or 13R in the column direction. Specifically, the TFTs 14 of the red pixels R and the TFTs 14 of the dummy pixels D are alternately connected to the leftmost source bus line 13L. Meanwhile, the TFTs 14 of the dummy pixels D and the TFTs 14 of the yellow pixels Y are alternately connected to the rightmost source bus line 13R.

In this manner, those TFTs 14 are also arranged in a hound's-tooth check pattern with respect to each of the left- and rightmost source bus lines 13L and 13R. That is why the TFTs 14 that are connected to each of these two source bus lines 13L and 13R at the two farthest ends include a group of TFTs 14 of pixels belonging to a column of pixels inside of the display area and another group of TFTs 14 of pixels belonging to another column of pixels outside of the display area (i.e., a column of dummy pixels), and these two groups are comprised of the same number of TFTs 14. Consequently, each of these left- and rightmost source bus lines 13L and 13R can also have the same total area of sets of pixels connected as that of sets of pixels that are connected to any other source bus line 13. It should be noted that the pixel electrodes 11 do not always have to be provided for the dummy pixels P with no TFTs 14 but could be omitted. Nevertheless, the pixel electrodes 11 of such dummy pixels D with no TFTs 14 had better be supplied with the same potential as the counter electrode (which is sometimes called a "common electrode"). That is to say, the pixel electrodes 11 of such dummy pixels D had better be electrically connected to the counter electrode.

Figure 4:
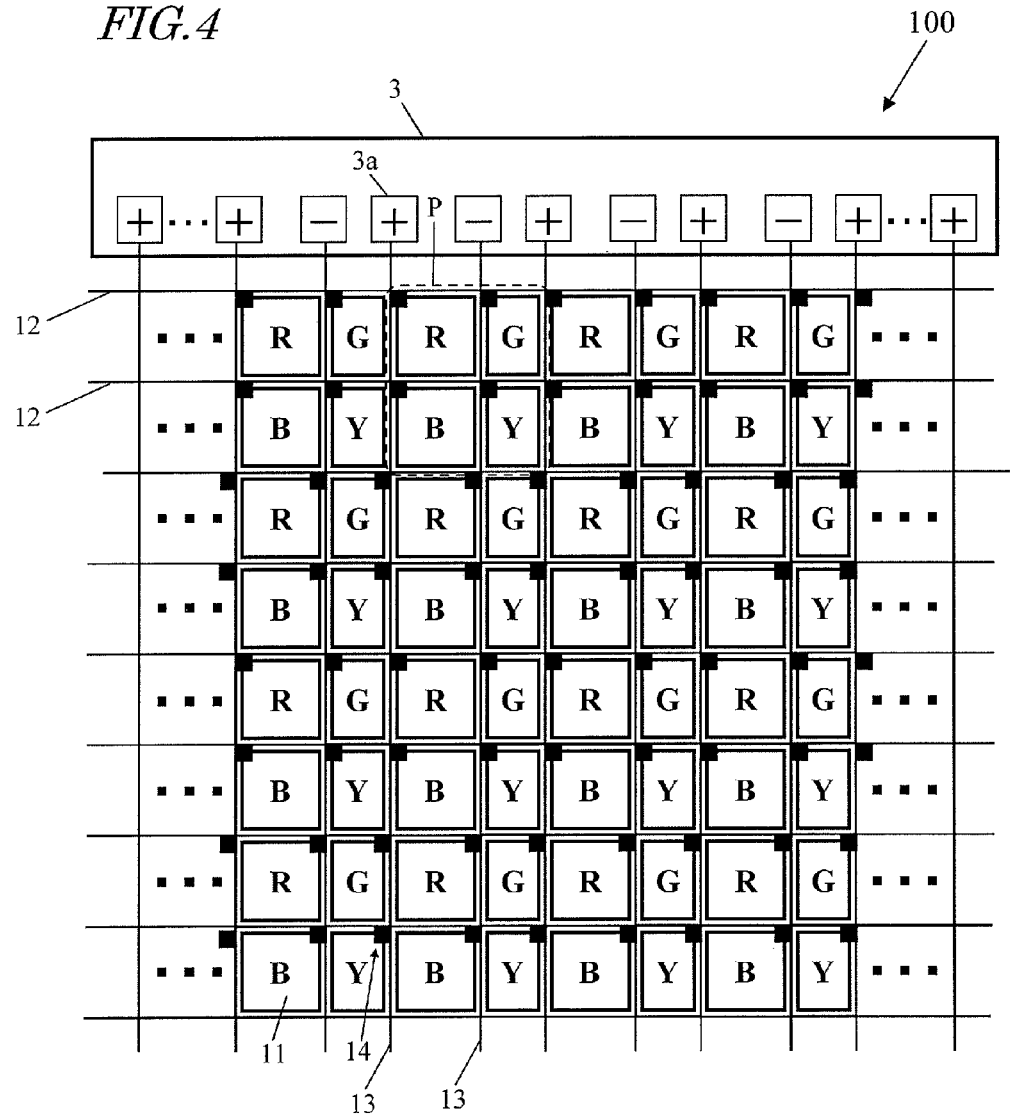
[FIG. 4] A plan view schematically illustrating a part of the liquid crystal display device 100 as the preferred embodiment of the present invention.

In the embodiment described above, the TFTs 14 of one column of pixels on the right-hand side of each source bus line 13 and the TFTs 14 of the other column of pixels on its left are alternately connected to that source bus line 13 in the column direction every other row. However, this is just an example of the present invention and such a configuration does not always have to be adopted. Rather, the configuration may also be modified arbitrarily as long as the number of TFTs 14 of the right column of pixels that are connected to each source bus line 13 is the same as that of TFTs 14 of the left column of pixels that are also connected to that source bus line 13. For example, as shown in FIG. 4, the TFTs 14 of the right column of pixels and the TFTs 14 of the left column of pixels may be connected to each source bus line 13 every two rows in the column direction.

In the embodiment described above, the red and blue pixels R and B are supposed to be the larger pixels and the green and yellow pixels G and Y are supposed to be the smaller pixels. However, any of those pixels may be defined to be the larger (or smaller) pixel. Nevertheless, from the standpoint of color reproducibility, it is recommended that the red and blue pixels R and B be the larger pixels.

(Embodiment 2)

Figure 5:
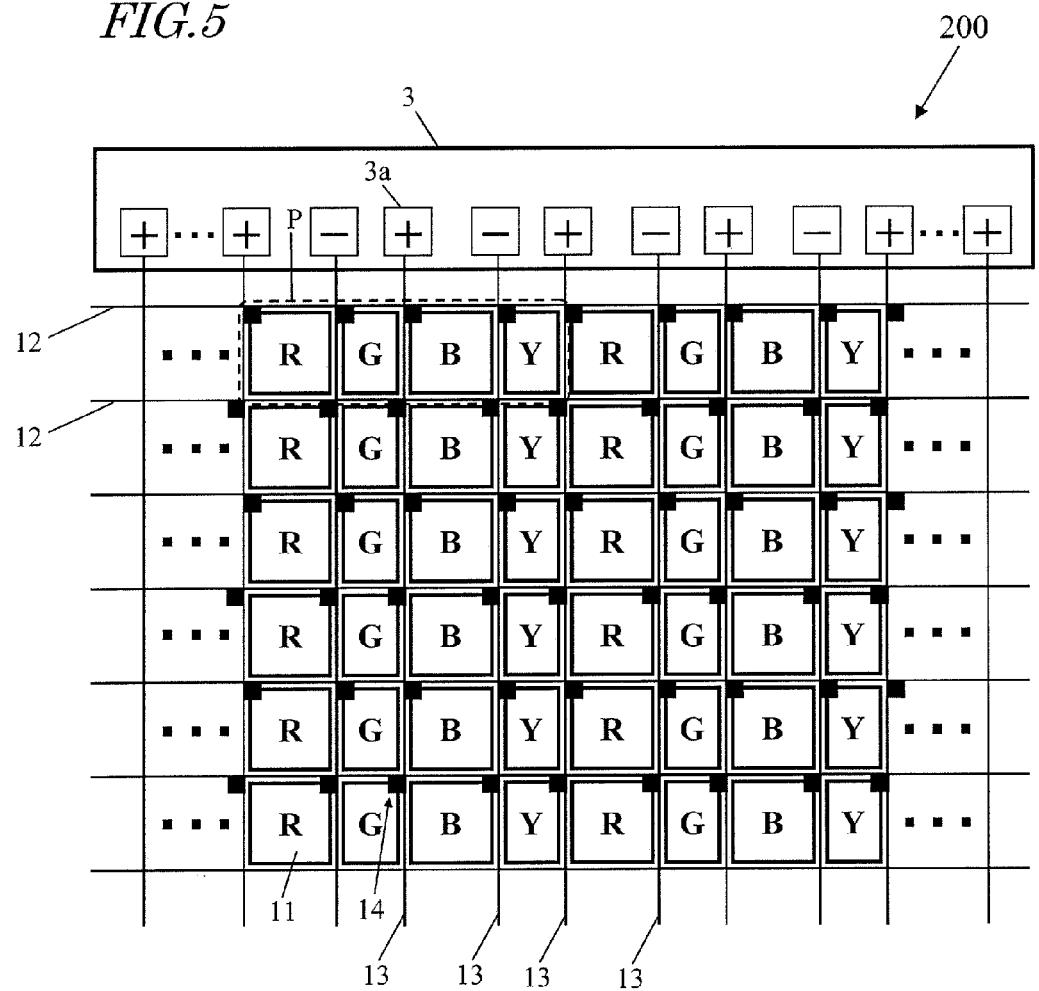
[FIG. 5] A plan view schematically illustrating a part of a liquid crystal display device 200 as another preferred embodiment of the present invention.

FIG. 5 illustrates a liquid crystal display device 200 as a second embodiment of the present invention. In the liquid crystal display device 100 of the first embodiment, one color display pixel P is comprised of four pixels that are arranged in two columns and two rows (see FIGS. 1 and 2). On the other hand, in the liquid crystal display device 200 of this embodiment, one color display pixel P is comprised of four pixels (namely, red, green, blue, and yellow pixels R, G, B and Y) that are arranged in four columns and one row as shown in FIG. 5. That is to say, in this liquid crystal display device 200, the color filters have a striped arrangement.

In this embodiment, the red and blue pixels R and B have a relatively large area and the green and yellow pixels G and Y have a relatively small area. That is to say, the red and blue pixels R and B are the larger pixels and the green and yellow pixels G and Y are the smaller pixels.

In the example illustrated in FIG. 5, the four pixels are arranged in the order of red, green, blue, and yellow pixels R, G, B and Y from the left to the right within each color display pixel P. Thus, if n is supposed to be an integer that is equal to or greater than zero, the $(4n+1)^{th}$ column of pixels consists of red pixels R, the $(4n+2)^{th}$ column of pixels consists of green pixels G, the $(4n+3)^{th}$ column of pixels consists of blue pixels B, and the $(4n+4)^{th}$ column of pixels consists of yellow pixels Y. Therefore, in this embodiment, columns of pixels comprised of the larger pixels also alternate with columns of pixels comprised of the smaller pixels in the display area.

As shown in FIG. 5, in the liquid crystal display device 200 of this embodiment, the TFTs 14 of pixels belonging to a column of pixels that is located on the right-hand side of each source bus line 13 and the TFTs 14 of pixels belonging to another column of pixels that is located on the left-hand side of that source bus line 13 are also alternately connected to that source bus line 13 in the column direction. Specifically, to a source bus line 13 that runs between a column of pixels comprised of yellow pixels Y and another column of pixels comprised of red pixels R, the TFTs 14 of the red pixels R and the TFTs 14 of the yellow pixels Y are alternately connected. To a source bus line 13 that runs between a column of pixels comprised of red pixels R and another column of pixels comprised of green pixels G, the TFTs 14 of the green pixels G and the TFTs 14 of the red pixels R are alternately connected. To a source bus line 13 that runs between a column of pixels comprised of green pixels G and another column of pixels comprised of blue pixels B, the TFTs 14 of the blue pixels B and the TFTs 14 of the green pixels G are alternately connected. And to a source bus line 13 that runs between a column of pixels comprised of blue pixels B and another column of pixels comprised of yellow pixels Y, the TFTs 14 of the yellow pixels Y and the TFTs 14 of the blue pixels B are alternately connected.

In this manner, those TFTs 14 are arranged in a hound's-tooth check pattern with respect to each source bus line 13. That is why the TFTs 14 that are connected to an arbitrary one of the source bus lines 13 include a group of TFTs 14 of pixels belonging to one of the two columns of pixels that are adjacent to that source bus line 13 and another group of TFTs 14 of pixels belonging to the other column of pixels, and these two groups are comprised of the same number of TFTs 14.

That is to say, sets of pixels to be supplied with a signal voltage from its associated source bus line 13 include as many larger pixels as smaller pixels. That is why the total area of those sets of pixels (i.e., sets of pixels that are connected to a single source bus line 13) is substantially the same. Consequently, in the liquid crystal display device 200 of this embodiment, generation of display unevenness that runs in the column direction (i.e., vertical fringes) can be reduced significantly.

Figure 6:
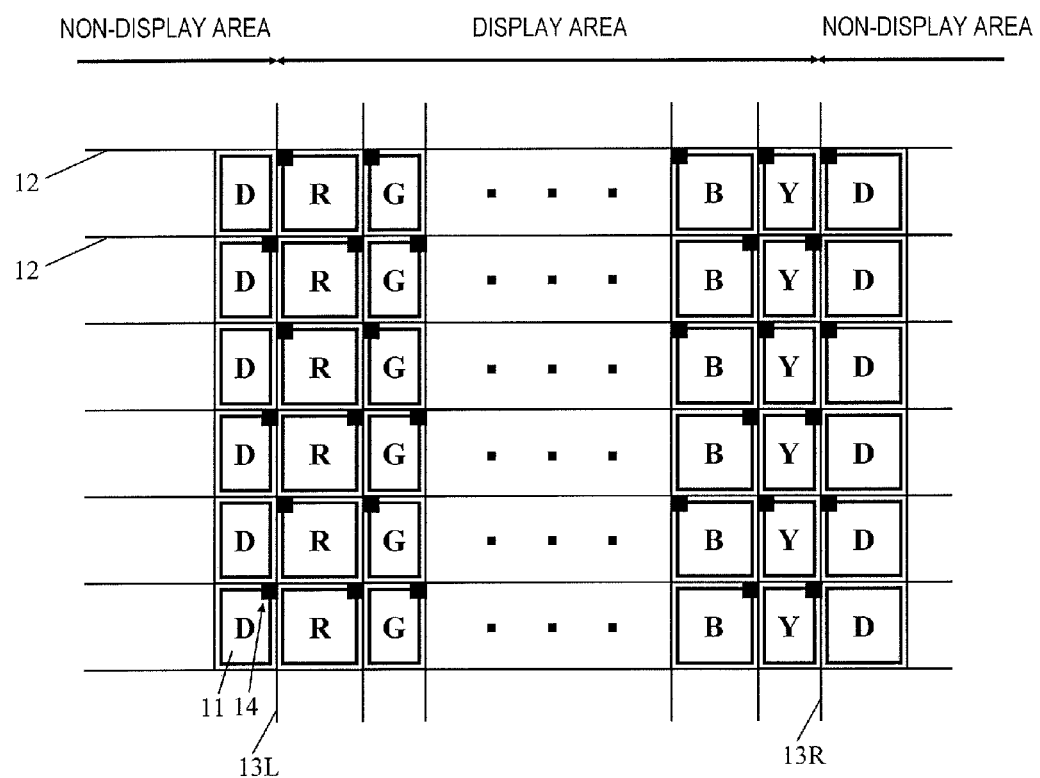
[FIG. 6] A plan view schematically illustrating the structure of the liquid crystal display device 200 in the vicinity of its leftmost and rightmost source bus lines 13L and 13R.

Furthermore, in the liquid crystal display device 200 of this embodiment, dummy pixels D are also provided beside two source bus lines 13L and 13R that are located at the two farthest ends as shown in FIG. 6. The dummy pixels D that are arranged near the leftmost source bus line 13L are smaller pixels that have the same area as green and yellow pixels G and Y. On the other hand, the dummy pixels D that are arranged near the rightmost source bus line 13R are larger pixels that have the same area as red and blue pixels R and B.

As shown in FIG. 6, as for each of these source bus lines 13L and 13R at the farthest ends, the TFTs 14 of pixels belonging to a column of pixels that is located on the right-hand side of that source bus line 13L or 13R and the TFTs 14 of pixels belonging to another column of pixels that is located on the left-hand side of that source bus line 13L or 13R are alternately connected to that source bus line 13L or 13R in the column direction. Specifically, the TFTs 14 of the red pixels R and the TFTs 14 of the dummy pixels D are alternately connected to the leftmost source bus line 13L. Meanwhile, the TFTs 14 of the dummy pixels D and the TFTs 14 of the yellow pixels Y are alternately connected to the rightmost source bus line 13R.

In this manner, those TFTs 14 are also arranged in a hound's-tooth check pattern with respect to each of the left- and rightmost source bus lines 13L and 13R. That is why the TFTs 14 that are connected to each of these two source bus lines 13L and 13R at the two farthest ends include a group of TFTs 14 of pixels belonging to a column of pixels inside of the display area and another group of TFTs 14 of pixels belonging to another column of pixels outside of the display area (i.e., a column of dummy pixels), and these two groups are comprised of the same number of TFTs 14. Consequently, each of these left- and rightmost source bus lines 13L and 13R can also have the same total area of sets of pixels connected as that of sets of pixels that are connected to any other source bus line 13. It should be noted that the pixel electrodes 11 do not always have to be provided for the dummy pixels P with no TFTs 14 but could be omitted as already described for the liquid crystal display device 100 of the first embodiment. Nevertheless, the pixel electrodes 11 of such dummy pixels D with no TFTs 14 had better be supplied with the same potential as the counter electrode. That is to say, the pixel electrodes 11 of such dummy pixels D had better be electrically connected to the counter electrode.

(Embodiment 3)

Figure 7:
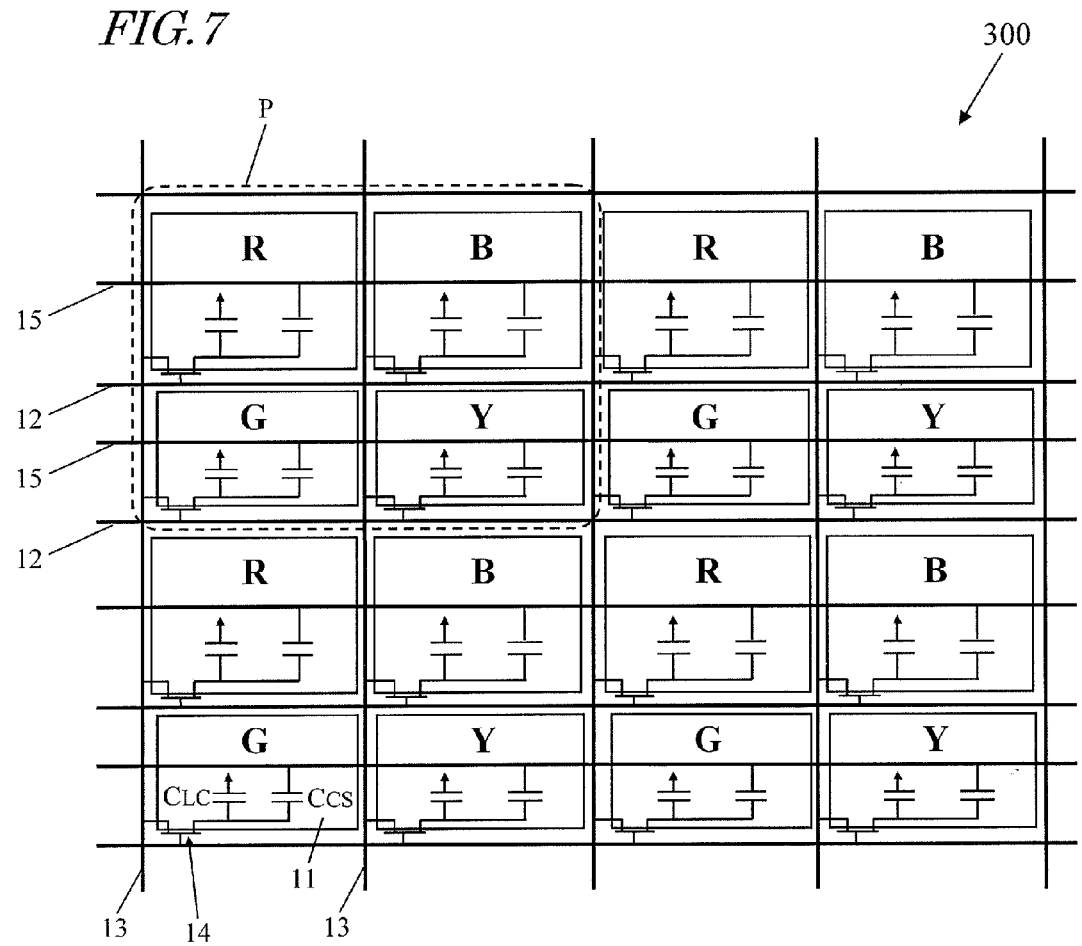
[FIG. 7] A plan view schematically illustrating a liquid crystal display device 300 as another preferred embodiment of the present invention.

FIG. 7 illustrates a liquid crystal display device 300 as a third embodiment of the present invention. FIG. 7 illustrates not only a plurality of gate bus lines 12 and a plurality of source bus lines 13 but also a plurality of Cs bus lines (storage capacitor lines) 15 as well. In addition, liquid crystal capacitors $C_{LC}$ and storage capacitors $C_{CS}$ that are electrically connected in parallel to the liquid crystal capacitor $C_{LC}$ are also shown.

In the liquid crystal display device 300 of this embodiment, one color display pixel P is made up of four pixels (namely, red, green, blue, and yellow pixels R, G, B and Y) that are arranged in two columns and two rows. In this embodiment, the red and blue pixels R and B have a relatively large area and the green and yellow pixels G and Y have a relatively small area. That is to say, the red and blue pixels R and B are the larger pixels and the green and yellow pixels G and Y are the smaller pixels.

In the example illustrated in FIG. 7, those four pixels are arranged in the order of red, green, yellow and blue pixels R, G, Y and B counterclockwise from the upper left corner within each color display pixel P. Therefore, each odd-numbered column of pixels is comprised of red and green pixels R and G and each even-numbered column of pixels is comprised of blue and yellow pixels B and Y. Also, if rows of pixels comprised of a plurality of pixels are sequentially counted "$1^{st}$, $2^{nd}$, $3^{rd}$ . . . rows of pixels" from the top to the bottom, then each odd-numbered row of pixels is comprised of red and blue pixels R and B and each even-numbered row of pixels is comprised of green and yellow pixels G and Y. In other words, the plurality of pixels of this liquid crystal display device 300 are arranged so that rows of pixels comprised of the larger pixels alternate with rows of pixels comprised of the smaller pixels.

In this embodiment, the four pixels (that are arranged in two columns and two rows and) that form one color display pixel P are arranged so as to prevent any arbitrary row in the color display pixel P (i.e., any of its two rows) from including pixels with mutually different areas in the same mix as shown in FIG. 7. That is to say, sets of pixels to be supplied with a signal voltage from its associated source bus line 13 include as many larger pixels as smaller pixels. That is why the total area of those sets of pixels (i.e., sets of pixels that are connected to a single source bus line 13) is substantially the same. Consequently, in the liquid crystal display device 300 of this embodiment, generation of display unevenness that runs in the column direction (i.e., vertical fringes) can be reduced significantly.

In the configuration shown in FIG. 7, two gate bus lines 12 associated with an odd-numbered row of pixels (comprised of red and blue pixels R and B) and with an even-numbered row of pixels (comprised of green and yellow pixels G and Y) are connected to two groups of pixels that have mutually different total areas, and therefore, will have mutually different capacitive loads. In order to match the capacitive loads of multiple gate bus lines 12 with each other, the configuration shown in FIG. 7 had better be replaced with the one shown in FIG. 8.

Figure 8:
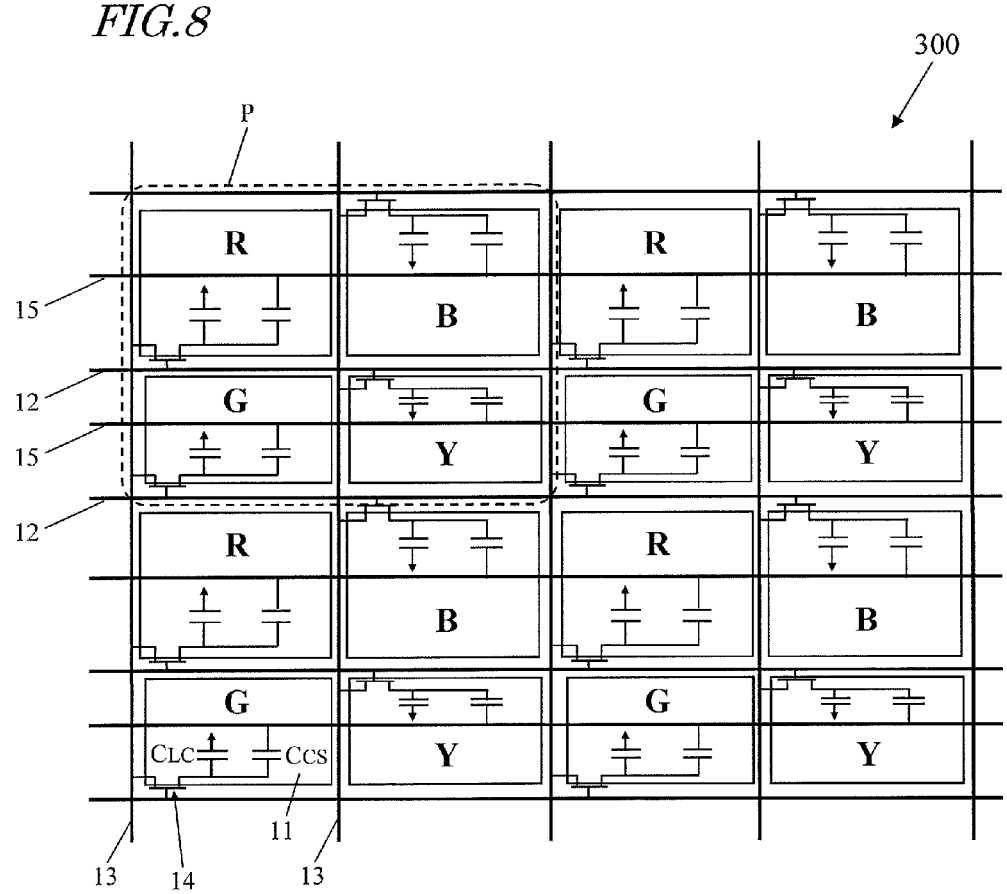
[FIG. 8] A plan view schematically illustrating a liquid crystal display device 300 as another preferred embodiment of the present invention.

In the configuration shown in FIG. 8, the TFTs 14 are arranged with respect to each gate bus line 12 differently from in a general liquid crystal display device. As shown in FIG. 8, the TFTs 14 of pixels belonging to a row of pixels that is located over each gate bus line 12 and the TFTs 14 of pixels belonging to another row of pixels that is located under that gate bus line 12 are alternately connected to that gate bus line 12 in the row direction. Specifically, if attention is paid to a gate bus line 12 that runs between an upper row of pixels comprised of red and blue pixels R and B and a lower row of pixels comprised of green and yellow pixels G and Y, it can be seen that the TFTs 14 of the red pixels R and the TFTs 14 of the yellow pixels Y are alternately connected to that gate bus line 12. Meanwhile, if attention is paid to a gate bus line 12 that runs between an upper row of pixels comprised of green and yellow pixels G and Y and a lower row of pixels comprised of red and blue pixels R and B, it can be seen that the TFTs 14 of the green pixels B and the TFTs 14 of the blue pixels B are alternately connected to that gate bus line 12.

In this manner, those TFTs 14 are arranged in a hound's-tooth check pattern with respect to each gate bus line 12. That is why the TFTs 14 that are connected to an arbitrary one of the gate bus lines 14 include a group of TFTs 14 of pixels belonging to one of the two rows of pixels that are adjacent to that gate bus line 12 and another group of TFTs 14 of pixels belonging to the other column of pixels, and these two groups are comprised of the same number of TFTs 14.

That is to say, sets of pixels to be supplied with a scan voltage from its associated gate bus line 12 include as many larger pixels as smaller pixels. That is why the total area of those sets of pixels (i.e., sets of pixels that are connected to a single gate bus line 12) is substantially the same (specifically, its variation is within ±15%). Consequently, the capacitive loads on the plurality of gate bus lines 12 can be matched to each other.

If the configuration shown in FIG. 8 is adopted, a row of pixels comprised of dummy pixels that do not contribute to a display operation (which will be referred to herein as a "row of dummy pixels") had better be arranged outside of the display area (i.e., in a non-display area) so that two groups of pixel sets that are connected to two of the gate bus lines 12 that are located at two farthest ends (i.e., at the outermost ends) in the column direction have substantially the same total areas. By providing the row of dummy pixels, the plurality of TFTs 14 can also be arranged in the hound's-tooth check pattern with respect to those two gate bus lines 12 at the two farthest ends. As a result, those TFTs 14 that are connected to each of the two gate bus lines 12 that are located at the two farthest ends can include as many TFTs 14 of pixels belonging to a row of pixels in the display area as TFTs 14 of pixels belonging to a row of pixels outside of the display area (i.e., a row of dummy pixels). Consequently, as for each of those gate bus lines 12 at the two farthest ends, the total area of the multiple sets of pixels that are connected to that gate bus line 12 can be substantially as large as that of multiple sets of pixels that are connected to any other gate bus line 12. It should be noted that the pixel electrodes 11 do not always have to be provided for the dummy pixels with no TFTs 14 but could be omitted. Nevertheless, the pixel electrodes 11 of such dummy pixels with no TFTs 14 had better be supplied with the same potential as the counter electrode. That is to say, the pixel electrodes 11 of such dummy pixels had better be electrically connected to the counter electrode.

Figure 9:
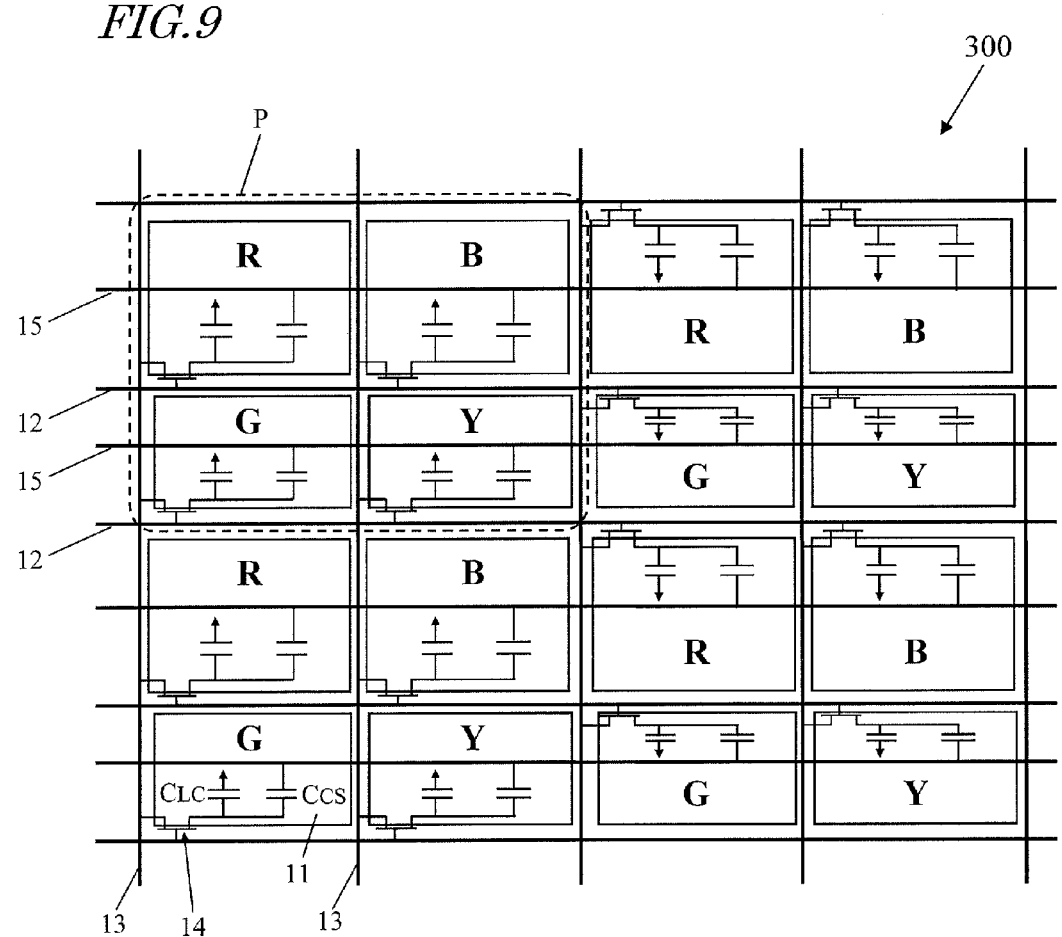
[FIG. 9] A plan view schematically illustrating a liquid crystal display device 300 as another preferred embodiment of the present invention.

In the embodiment described above, the TFTs 14 of one row of pixels over each gate bus line 12 and the TFTs 14 of the other row of pixels under the gate bus line 12 are alternately connected to that gate bus line 12 in the row direction every other column. However, this is just an example of the present invention and such a configuration does not always have to be adopted. Rather, the configuration may also be modified arbitrarily as long as the number of TFTs 14 of the upper row of pixels connected to each gate bus line 13 is the same as that of TFTs 14 of the lower column of pixels that are also connected to that gate bus line 12. For example, as shown in FIG. 9, the TFTs 14 of the upper row of pixels and the TFTs 14 of the lower row of pixels may be connected to each gate bus line 12 every two columns in the row direction.

In the first, second and third embodiments of the present invention described above, one color display pixel P is supposed to be comprised of red, green, blue, and yellow pixels R, G, B and Y. However, as for the respective kinds (i.e., the combination) of pixels that define one color display pixel P, the combination described above is just an example, too. For example, each color display pixel P may be defined by either red, green, blue pixels R, G, and B and a cyan pixels representing the color cyan or red, green, and blue pixels R, G, and B and a magenta pixels representing the color magenta. Alternatively, each color display pixel P may also be defined by red, green, blue and white pixels R, G, B and W as disclosed in Japanese Laid-Open Patent Publication No. 11-295717. In that case, the color reproduction range cannot be broadened because the primary color added is the color white, but the overall display luminance of a single color display pixel P can be increased.

Furthermore, the number of pixels that form one color display pixel P does not have to be four. But the present invention is broadly applicable to any liquid crystal display device, in which one color display pixel P is comprised of four or any other larger even number of pixels. The even number of pixels that form one color display pixel P may be arranged in either p rows and q columns (where p and q are integers that are equal to or greater than two) or one row and r columns (where r is an even number that is equal to or greater than four) in one color display pixel P.

For example, one color display pixel P may be comprised of six pixels. In that case, those six pixels had better include red, green, blue, and yellow subpixels R, G, B and Y and may include cyan and magenta pixels as the other two pixels.

It should be noted that the even number of pixels that form one color display pixel P do not always have to represent mutually different colors but could include two or more pixels representing the same color. For example, as disclosed in PCT International Application Publication No. 2007/034770, the six pixels that form one color display pixel P may include two red pixels R.

Furthermore, it is also recommended that a multi-pixel structure be introduced. In this description, the "multi-pixel structure" refers herein to a structure in which each pixel has a bright subpixel that has a higher luminance than a grayscale to display and a dark pixel that has lower luminance than the grayscale to display. By introducing the multi-pixel structure, the viewing angle dependence of the γ characteristic can be reduced. As the multi-pixel structure, the structure disclosed in Japanese Laid-Open Patent Publication No. 2006-133577 may be adopted, for example. The entire disclosure of Japanese Laid-Open Patent Publication No. 2006-133577 is hereby incorporated by reference.

Hereinafter, the configuration and operation of a liquid crystal display device with the multi-pixel structure will be described with reference to FIG. 10, which illustrates what configuration is obtained if the multi-pixel structure disclosed in Japanese Laid-Open Patent Publication No. 2006-133577 is applied to the liquid crystal display device 300 of the third embodiment described above.

Figure 10:
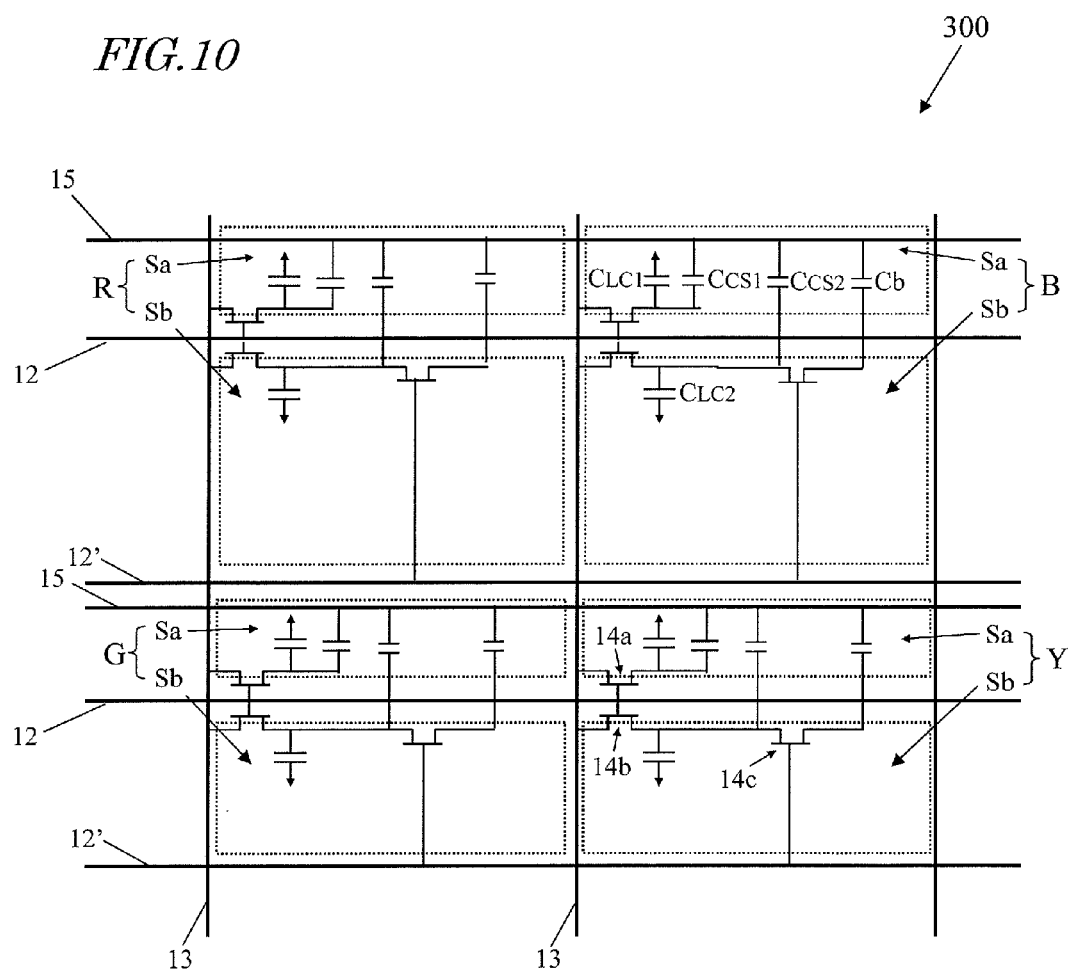
[FIG. 10] An equivalent circuit diagram schematically illustrating a configuration in which a multi-pixel structure is applied to the liquid crystal display device 300 as a preferred embodiment of the present invention.

In the configuration shown in FIG. 10, each of the red, green, blue, and yellow pixels R, G, B and Y has two subpixels Sa and Sb, which function as a bright subpixel and a dark subpixel, respectively, in this example. These subpixels Sa and Sb are obtained by splitting each pixel into two in the column direction. The area ratio of these subpixels Sa and Sb does not have to be the illustrated one but could be changed appropriately. The bright subpixel Sa includes a liquid crystal capacitor $C_{LC1}$ and a storage capacitor $C_{CS1}$ and the dark subpixel Sb includes a liquid crystal capacitor $C_{LC2}$ and a storage capacitor $C_{CS2}$.

Each pixel includes two TFTs 14a and 14b, to which the bright subpixel Sa and the dark subpixel Sb are connected, respectively. These TFTs 14a and 14b have their gate connected in common to the same gate bus line 12, and their source connected in common to the same source bus line 13. That is to say, each of these subpixels Sa and Sb has a subpixel electrode corresponding to the pixel electrode 11. And the subpixel electrodes of these subpixels Sa and Sb are connected to the drain of their associated TFTs 14a and 14b and are also connected to the same source bus line 13 via the TFTs 14a and 14b.

Each pixel further includes a third TFT 14c, which electrically connects and disconnects the pixel capacitor (=$C_{LC2}$+$C_{CS2}$) of the dark subpixel Sb to/from a buffer capacitor Cb to be electrically connected in parallel to that pixel capacitor as shown in FIG. 10. The gate of that TFT 14c is either connected to the gate bus line of the next stage (which is identified by the reference numeral 12' in FIG. 10) or configured to receive an ON signal from a gate driver separately provided synchronously with the signal of the next stage. The TFT 14c turns ON at the same time with the TFTs 14a and 14b of the next stage (i.e., the color display pixel P that is adjacent to the current one in the column direction). By turning this third TFT 14c ON, the luminance of the subpixel Sb becomes lower than that of the subpixel Sa.

The multi-pixel structure disclosed in Japanese Laid-Open Patent Publication No. 2006-133577 can be used effectively in a vertical alignment liquid crystal display device that conducts a display operation in normally black mode. In that liquid crystal display device, each pixel comes to have multiple liquid crystal domains including four liquid crystal domains, of which the directors define azimuth angles of 45, 135, 225 and 315 degrees, respectively, typically when a voltage is applied to at least the liquid crystal layer. In this case, the azimuth angles are defined on the supposition that the three o'clock direction (i.e., rightward direction) defines an azimuthal angle of 0 degrees and the counterclockwise direction is positive if the display screen is compared to the face of a clock.

Another multi-pixel structure that is applicable to the liquid crystal display device of the present invention is what is disclosed by the Applicant of the present application in Japanese Laid-Open Patent Publication No. 2004-62146 (corresponding to U.S. Pat. No. 6,958,791). In that multi-pixel structure, a storage capacitor is provided for each of multiple subpixels in a pixel, a storage capacitor counter electrode that forms part of the storage capacitor (and that is connected to a Cs bus line) is made electrically independent on a subpixel basis, and the voltage applied to that storage capacitor counter electrode (which will be referred to herein as a "storage capacitor counter voltage") is changed, thereby applying mutually different effective voltages to the respective liquid crystal layers of the multiple pixels using a capacitance division technique. The entire disclosure of Japanese Laid-Open Patent Publication No. 2004-62146 (corresponding to U.S. Pat. No. 6,958,791) is hereby incorporated by reference.

Japanese Laid-Open Patent Publication No. 2006-133577 discloses a so-called "MVA mode liquid crystal display device" as a vertical alignment display device. The MVA mode liquid crystal display device controls the directions of the directors of liquid crystal domains to be produced when a voltage is applied thereto by providing linear slits (to be cut through electrodes) and/or linear dielectric projections (ribs) (to be arranged on the surface of the electrodes to face the liquid crystal layer) for a pair of substrates that faces each other with the liquid crystal layer interposed between them so that those slits and ribs are alternately arranged parallel to each other when viewed along a normal to the substrates. In that case, the directions of the liquid crystal domains become perpendicular to the directions in which the linear slits or dielectric projections (which will be collectively referred to herein as "linear structures") run.

Such MVA-mode liquid crystal display devices are currently used extensively in liquid crystal TVs. An MVA-mode liquid crystal display device, however, controls the directions of the directors of liquid crystal domains by using the alignment control force produced by those linear structures. That is why the response of liquid crystal molecules is certainly fast (i.e., the alignment direction changes rapidly) near those linear structures but slow elsewhere, which is a problem.

A PSA-mode liquid crystal display device is known as a vertical alignment liquid crystal display device that has a better response characteristic than the MVA-mode liquid crystal display device. The polymer sustained alignment technology (which will be referred to herein as "PSA technology") is disclosed in Japanese Laid-Open Patent Publications No. 2002-357830, No. 2003-177418, and No. 2006-78968 and by K. Hanaoka et al in "A New MVA-LCD by Polymer Sustained Alignment Technology", SID 04 DIGEST1200-1203 (2004), for example. The entire disclosures of all of these four documents are hereby incorporated by reference.

According to the PSA technology, a small amount of a polymerizable compound (such as a photo-polymerizable monomer or oligomer) is introduced into the liquid crystal material, and the polymerizable material is irradiated with an active energy ray (such as an ultraviolet ray) with a predetermined voltage applied to the liquid crystal layer after the liquid crystal cell has been assembled, thereby controlling the pretilt direction of liquid crystal molecules with the polymer thus produced. The alignment state of the liquid crystal molecules when the polymer is produced is sustained (i.e., memorized) even after the voltage is removed (i.e., no longer applied). A layer of such a polymer will be referred to herein as an "alignment sustained layer". The alignment sustained layer is formed on the surface of an alignment film (i.e., to face the liquid crystal layer). However, the alignment sustained layer does not always have to be a film that covers the entire surface of the alignment film but may also be a layer in which particles of the polymer are present discretely.

According to the PSA technology, by controlling the electric field generated in the liquid crystal layer, the pretilt direction and pretilt angle of liquid crystal molecules can be adjusted, which is beneficial. In addition, the alignment sustained layer can exert the alignment control force on almost the entire surface that contacts with the liquid crystal layer. As a result, the PSA-mode liquid crystal display device achieves a better response characteristic than the MVA-mode liquid crystal display device, which is also advantageous.

Figure 11:
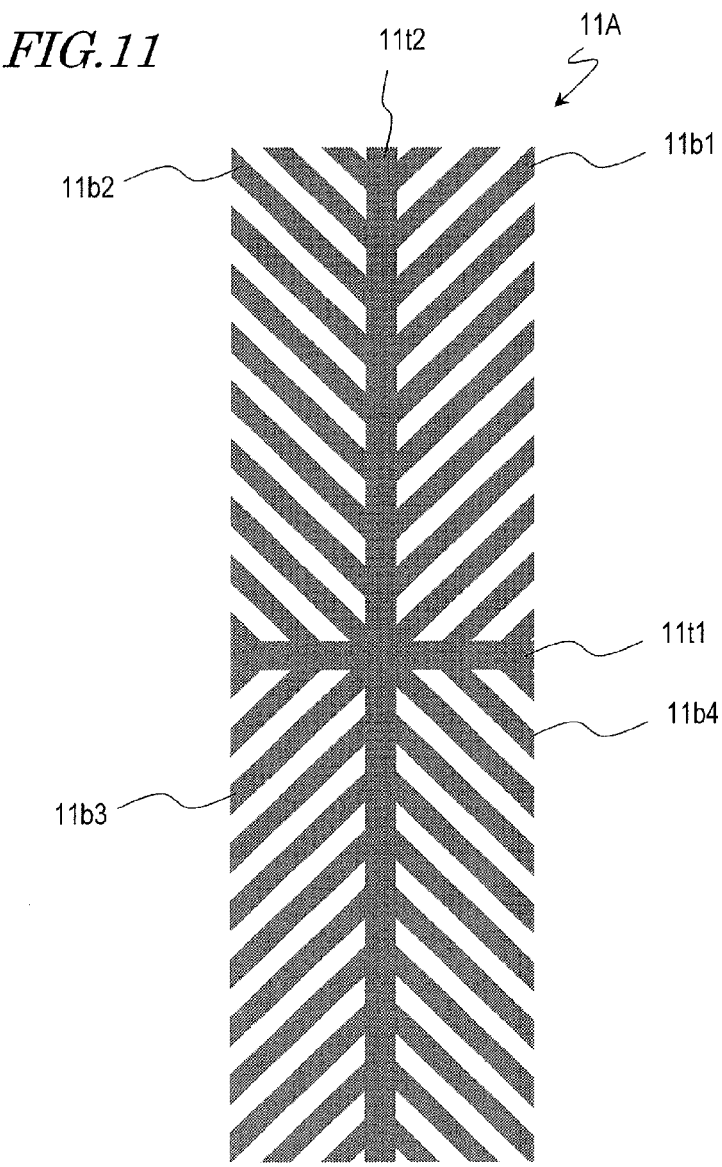
[FIG. 11] A plan view schematically illustrating a pixel electrode 11A that can be used effectively in a PSA-mode liquid crystal display device.
Figure 12:
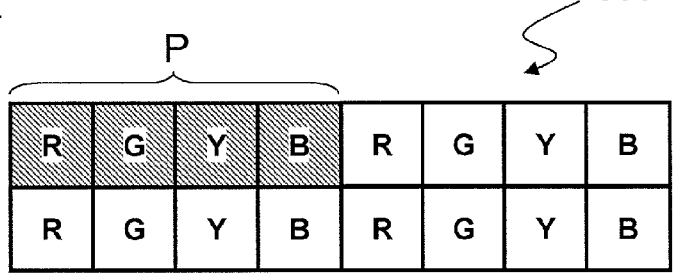
[FIG. 12] A diagram schematically illustrating a known liquid crystal display device 800.
Figure 13:
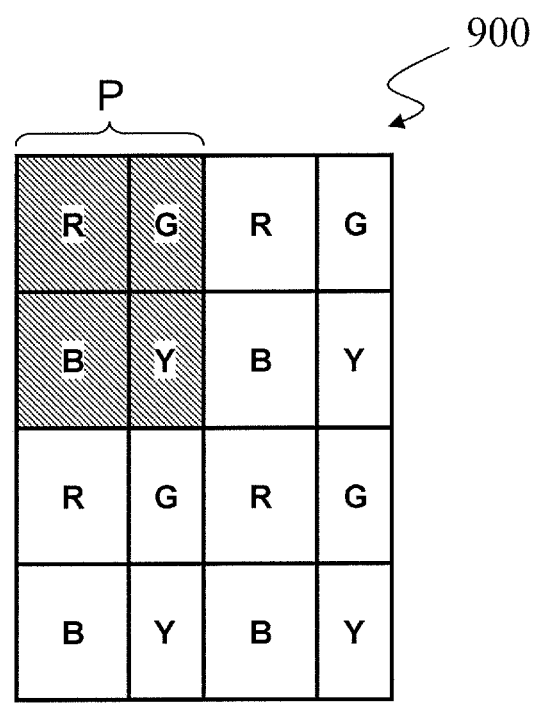
[FIG. 13] A diagram schematically illustrating another known liquid crystal display device 900.

A PSA-mode liquid crystal display device as an embodiment of the present invention is obtained by using the pixel electrode 11A shown in FIG. 11 as the pixel electrode of the LCD panel 1 and by applying the PSA technology described above to that pixel electrode 11A.

The pixel electrode 11A includes crossed trunk portions 11t1 and 11t2, which are arranged to overlap with the axes of polarization of the two polarizers, and a plurality of branch portions 11b1, 11b2, 11b3 and 11b4, which run in respective directions that define an angle of approximately 45 degrees with respect to those crossed trunk portions 11t1 and 11t2.

Specifically, the trunk portions include the trunk portion 11t1 that runs in the row direction (i.e., horizontally) and the trunk portion 11t2 that runs in the column direction (i.e., vertically). Supposing the rightward direction on the display screen (i.e., the three o'clock direction if the display screen is compared to the face of a clock) defines an azimuthal angle of 0 degrees, the plurality of branch portions include a first group (including the branch portion 11b1) that runs in a 45 degree direction with respect to the trunk portion, a second group (including the branch portion 11b2) that runs in a 135 degree direction with respect to the trunk portion, a third group (including the branch portion 11b3) that runs in a 225 degree direction with respect to the trunk portion, and a fourth group (including the branch portion 11b4) that runs in a 315 degree direction with respect to the trunk portion. The liquid crystal molecules (with negative dielectric anisotropy) of the vertical alignment liquid crystal layer will tilt in those directions in which these branch portions run under an oblique electric field applied by the trunk and branch portions. This is because the oblique electric field applied by those branch portions that run parallel to each other makes the liquid crystal molecules tilt perpendicularly to the direction in which those branch portions run, while the oblique electric field applied by the trunk portions makes the liquid crystal molecules tilt in the directions in which the trunk portions run. By adopting the PSA technology, the alignment of the liquid crystal molecules to be induced when a voltage is applied to the liquid crystal layer can be stabilized.

Industrial Applicability

The present invention can be used effectively in a liquid crystal display device of which each color display pixel is comprised of four or more pixels. For example, the present invention may be used effectively in a multi-primary-color liquid crystal display device that conducts a display operation using four or more primary colors.

Reference Signs List
1 LCD panel
2 gate driver (scan line driver)
3 source driver (signal line driver)
3a output terminal
11 pixel electrode
12 gate bus line (scan line)
13 source bus line (signal line)
13R rightmost source bus line
13L leftmost source bus line
14 thin-film transistor (TFT)
15 CS bus line (storage capacitor line)
100, 200, 300 liquid crystal display device
P color display pixel
R red pixel
G green pixel
B blue pixel
Y yellow pixel
D dummy pixel

The invention claimed is:

1. A liquid crystal display device, comprising:
a plurality of pixels arranged in columns and rows to define a matrix pattern, each one of the plurality of pixels includes an even number of four or more subpixels;
a plurality of source bus lines which extend in a column direction; wherein
the subpixels of each of the plurality of pixels include larger subpixels and smaller subpixels which are smaller in area than the larger subpixels;
the larger subpixels are arranged along odd numbered lines parallel to the column direction and the smaller subpixels are arranged along even numbered lines parallel to the column direction and adjacent to the odd numbered lines;
first ones of the plurality of source bus lines are connected to first groups of the subpixels in the odd numbered lines and first groups of the subpixels in the even numbered lines;
second ones of the plurality of source bus lines, which are adjacent to the first ones of the plurality of source bus lines, are connected to second groups of the subpixels in the even numbered lines and second groups of the subpixels in the odd numbered lines;
a total area of all of the subpixels connected to one of the first ones of the plurality of source bus lines is equal to or substantially equal to a total area of all of the subpixels connected to one of the second ones of the plurality of source bus lines; and
the even number of the subpixels are arranged in p rows and q columns (where p and q are integers that are equal to or greater than two).

2. The liquid crystal display device of claim 1, wherein one half of the even number of subpixels are the larger subpixels and another half of the even number of subpixels are the smaller subpixels.

3. The liquid crystal display device of claim 2, wherein each of the first and second groups of the subpixels includes a same number of the larger subpixels and the smaller subpixels.

4. The liquid crystal display device of claim 3, wherein the plurality of pixels are arranged so that a column of the subpixels comprised of the larger subpixels alternates with a column of the subpixels comprised of the smaller subpixels in a display area.

5. The liquid crystal display device of claim 4, wherein
each of the plurality of subpixels includes a switching element that is connected to an associated one of the plurality of source bus lines, and
wherein the switching elements that are connected to an arbitrary one of the source bus lines include: (i) one group of switching elements of the subpixels included in one of two columns of the subpixels that are adjacent to the arbitrary source bus line and (ii) another group of switching elements of the subpixels included in another column of the subpixels, the one group of switching elements and the another group of switching elements each include a same number of switching elements.

6. The liquid crystal display device of claim 1, wherein
the plurality of pixels include dummy pixels that do not contribute to a display operation, and
wherein the plurality of pixels are arranged so that a column of pixels comprised of the dummy pixels is located outside of a display area, and
wherein switching elements that are connected to two of the plurality of source bus lines that are located at two ends in a row direction include one number of switching elements of the subpixels belong to a column of pixels inside of the display area and a same number of switching elements of the subpixels belonging to another column of pixels outside of the display area.

7. A liquid crystal display device, comprising:
a plurality of pixels arranged in columns and rows to define a matrix pattern, each one of the plurality of pixels includes an even number of four or more subpixels;
a plurality of source bus lines which extend in a column direction; wherein
the subpixels of each of the plurality of pixels include larger subpixels and smaller subpixels which are smaller in area than the larger subpixels;
the larger subpixels are arranged along odd numbered lines parallel to the column direction and the smaller subpixels are arranged along even numbered lines parallel to the column direction and adjacent to the odd numbered lines;
first ones of the plurality of source bus lines are connected to first groups of the subpixels in the odd numbered lines and first groups of the subpixels in the even numbered lines;
second ones of the plurality of source bus lines, which are adjacent to the first ones of the plurality of source bus lines, are connected to second groups of the subpixels in the even numbered lines and second groups of the subpixels in the odd numbered lines;
a total area of all of the subpixels connected to one of the first ones of the plurality of source bus lines is equal to or substantially equal to a total area of all of the subpixels connected to one of the second ones of the plurality of source bus lines; and
the even number of subpixels include at least red, green, blue, and yellow subpixels.

8. The liquid crystal display device of claim 7, wherein
the red and blue subpixels are the larger subpixels, and
wherein the green and yellow subpixels are the smaller subpixels.

9. A liquid crystal display device, comprising:
a plurality of pixels arranged in columns and rows to define a matrix pattern, each one of the plurality of pixels includes an even number of four or more subpixels;
a plurality of source bus lines which extend in a column direction; wherein
the subpixels of each of the plurality of pixels include larger subpixels and smaller subpixels which are smaller in area than the larger subpixels;
the larger subpixels are arranged along odd numbered lines parallel to the column direction and the smaller subpixels are arranged along even numbered lines parallel to the column direction and adjacent to the odd numbered lines;
first ones of the plurality of source bus lines are connected to first groups of the subpixels in the odd numbered lines and first groups of the subpixels in the even numbered lines;
second ones of the plurality of source bus lines, which are adjacent to the first ones of the plurality of source bus lines, are connected to second groups of the subpixels in the even numbered lines and second groups of the subpixels in the odd numbered lines;
a total area of all of the subpixels connected to one of the first ones of the plurality of source bus lines is equal to or substantially equal to a total area of all of the subpixels connected to one of the second ones of the plurality of source bus lines; and
the even number of the subpixels are arranged in one row and r columns (where r is an even number that is equal to or greater than four).

10. The liquid crystal display device of claim 9, wherein one half of the even number of subpixels are the larger subpixels and another half of the even number of subpixels are the smaller subpixels.

11. The liquid crystal display device of claim 10, wherein each of the first and second groups of the subpixels includes a same number of the larger subpixels and the smaller subpixels.

12. The liquid crystal display device of claim 11, wherein the plurality of pixels are arranged so that a column of the subpixels comprised of the larger subpixels alternates with a column of the subpixels comprised of the smaller subpixels in a display area.

13. The liquid crystal display device of claim 12, wherein
each of the plurality of subpixels includes a switching element that is connected to an associated one of the plurality of source bus lines, and
wherein the switching elements that are connected to an arbitrary one of the source bus lines include: (i) one group of switching elements of the subpixels included in one of two columns of the subpixels that are adjacent to the arbitrary source bus line and (ii) another group of switching elements of the subpixels included in another column of the subpixels, the one group of switching elements and the another group of switching elements each include a same number of switching elements.

14. The liquid crystal display device of claim 9, wherein
the plurality of pixels include dummy pixels that do not contribute to a display operation, and
wherein the plurality of pixels are arranged so that a column of pixels comprised of the dummy pixels is located outside of a display area, and
wherein switching elements that are connected to two of the plurality of source bus lines that are located at two ends in a row direction include one number of switching elements of the subpixels belong to a column of pixels inside of the display area and a same number of switching elements of the subpixels belonging to another column of pixels outside of the display area.

* * * * *